UNITED STATES PATENT OFFICE.

PAUL KUHN, OF NEW YORK, N. Y.

ARTIFICIAL STONE.

1,105,979.     Specification of Letters Patent.     Patented Aug. 4, 1914.

No Drawing.     Application filed February 17, 1913. Serial No. 748,934.

*To all whom it may concern:*

Be it known that I, PAUL KUHN, a citizen of the German Empire, residing in New York, in the borough of the Bronx, county and State of New York, have invented certain new and useful Improvements in Compositions of Matter for Artificial Stone, of which the following is a specification.

This invention relates to an improved composition of matter for making artificial stone, coverings for steam-boilers and steam-pipes, electric conduits and the like, said composition being cast into molds without burning and especially adapted for interior walls of buildings and other purposes, in which a comparatively light, strong and fireproof material is required; and for this purpose the invention consists of a composition of matter which comprises plaster of Paris, Portland cement, magnesia carbonate, ashes, shavings and water.

The composition is made of the following proportions: plaster of Paris, 6 parts by weight; Portland cement, 6 parts by weight; magnesium carbonate, 1 part by weight; ashes, 4 parts by weight; shavings, 12 parts by weight; water, 16 parts by weight. The ashes and shavings are first moistened and then mixed with the plaster of Paris, Portland cement, the magnesia carbonate, water being gradually added as required. The shavings used are those from common pine or any other wood. The Portland cement and the magnesia retard the setting of the plaster of Paris, so that the liquid and easily-flowing mass can be readily cast into molds or shaped as required before setting. The ashes are screened in a mesh to a certain degree of fineness, while the shavings are disintegrated during the mixing of the substances in the mixing machine. They impart body to the mass and serve with the ashes as fillings for increasing the bulk and reducing the expense of the composition. After the mass has set in the molds, it is removed from the same and then permitted to dry either at ordinary or artificial temperature.

The composition is made in the form of hollow or solid bricks for building purposes, especially for interior and partition walls, or molded into coverings for steam-boilers and pipes, into electric conduits and other applications, for which a comparatively light, fire- and waterproof material is required. As no burning is required, the articles made from the improved composition of matter can be furnished much cheaper than cement articles on the one hand, or the burned bricks or other articles on the other hand. The articles made from the improved composition are fireproof, possess the required tensile strength for building purposes, are to a considerable degree waterproof, and can be jointed readily by the ordinary mortars in general use.

I claim:

A composition of matter for artificial stone prepared of the following ingredients and proportions: 6 parts of plaster of Paris, 6 parts of Portland cement, 1 part of magnesium carbonate, 4 parts of ashes, 12 parts of shavings, 16 parts of water.

In testimony, that I claim the foregoing as my invention, I have signed my name in presence of two subscribing witnesses.

PAUL KUHN.

Witnesses:
   PAUL GOEPEL,
   JOHN MURTAGH.